United States Patent [19]
Saiko et al.

[11] Patent Number: 5,848,679
[45] Date of Patent: Dec. 15, 1998

[54] TWO-WAY DIFFERENTIAL CLUTCH

[75] Inventors: Masaaki Saiko, Nagoya; Isao Mikuriya, Iwata, both of Japan

[73] Assignees: NTN Corporation, Osaka; Aichi Kikai Kogyo Kabushiki Kaisha, Nagoya, both of Japan

[21] Appl. No.: 679,446

[22] Filed: Jul. 12, 1996

[30] Foreign Application Priority Data

Jul. 14, 1995 [JP] Japan ..................................... 7-178421

[51] Int. Cl.⁶ ............................. F16D 41/10; F16D 43/02
[52] U.S. Cl. ........................... 192/37; 192/43.2; 192/45.1
[58] Field of Search ................................. 192/35, 36, 37, 192/43, 43.1, 43.2, 45.1, 41 A

[56] References Cited

U.S. PATENT DOCUMENTS 3,314,510   4/1967   Zlotek .
5,477,951   12/1995  Itoh et al. ............................... 192/45.1

FOREIGN PATENT DOCUMENTS 1 436 270   7/1991   European Pat. Off. .
1 174 583   7/1964   Germany .
34 07 918   9/1985   Germany .
44 15 774   2/1995   Germany .

*Primary Examiner*—Richard M. Lorence
*Attorney, Agent, or Firm*—Wenderoth, Lind & Ponack

[57] ABSTRACT

A two-way differential clutch having sprags. It includes a mechanism that permits the sprags to be inclined instantly in the opposite direction when the rotating direction of an input gear changes over. Two cages having different diameters are mounted between the cylindrical inner surface of an input gear and the cylindrical outer surface of a rotary shaft. The large-diameter cage is fixed to the input gear while the small-diameter cage is rotatably mounted on the rotary shaft. Sprags are received in pockets formed in both cages. A friction plate is rotatably mounted on the small-diameter cage near its end. It is pressed by a resilient member against a flange of the small-diameter cage. The friction plate is nonrotatably coupled to a gear case through a rotation stopper. With this arrangement, it is possible to create a large rotating speed difference between the large-diameter cage and the small-diameter cage when the rotating direction of the input gear changes over. Thus, the sprags can be instantly inclined in the opposite direction.

5 Claims, 9 Drawing Sheets

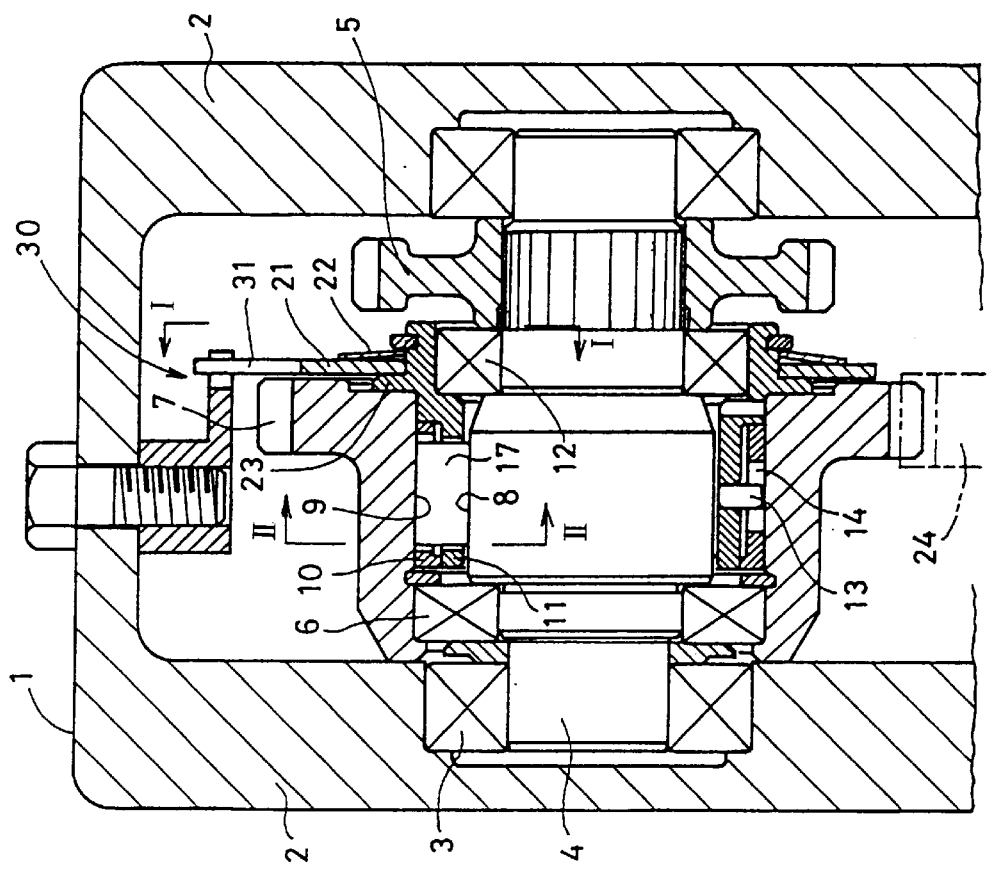
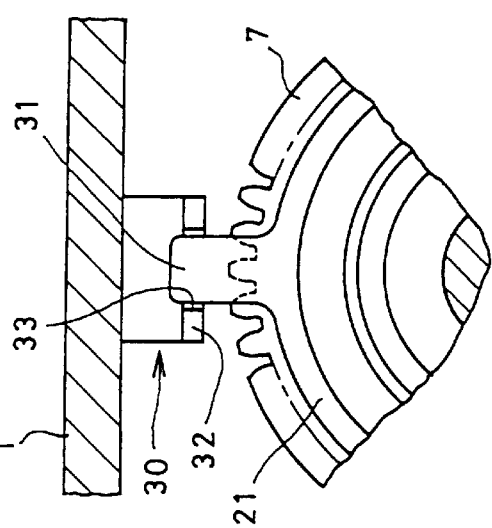

5,848,679

TWO-WAY DIFFERENTIAL CLUTCH

BACKGROUND OF THE INVENTION

This invention relates to a two-way differential clutch using sprags.

Power transmission devices used to transmit engine torque to vehicle wheels usually include a two-way differential clutch. A conventional two-way differential clutch is disclosed in Unexamined Japanese Patent Publication 3-199722.

As shown in FIGS. 9A and 9B, it has a rotary shaft 60 having a cylindrical outer surface 62, an output gear 61 mounted on the rotary shaft 60, an input gear 63 provided around the rotary shaft 60 and having a cylindrical inner surface 64, and two cages 65 an 66 having different diameters and mounted between the cylindrical surfaces 62 and 64. The large-diameter cage 65 is fixed to the input gear 63, while the small-diameter cage 66 is rotatably mounted on the rotary shaft 60. A pin 67 protruding from the small-diameter cage 66 is inserted in a cutout 68 formed in the large-diameter cage 65.

The cages 65 and 66 are formed with a plurality of pockets 69 and 70, respectively, at circumferentially equal intervals. A sprag 71 is received in each pair of diametrically opposing pockets 69 and 70. Resilient members 72 fixed to the small-diameter cage 66 bias each sprag 71 from both sides to its neutral position where its inner and outer cam surfaces 73 and 74 are not in engagement with the cylindrical outer surface 62 and the cylindrical inner surface 64, respectively.

A sub-gear 75 is rotatably mounted on the small-diameter cage 66 at one end thereof. It is pressed by a disk spring 76 against a flange 77 provided on the small-diameter cage 66.

A driving gear 78 rotated by an engine is in meshing engagement with the input gear 63 and the sub-gear 75. The sub-gear 75 has several more teeth than the input gear 63, so that the sub-gear 75 is rotated at a slower speed than the input gear 63 by the driving gear 78.

Since the sub-gear 75 is pressed against the flange 77 of the small-diameter cage 66, the latter is rotated at a slower speed than the input gear 63, so that the large-diameter cage 65 and the small-diameter cage 66 rotate relative to each other until the pin 67 abuts an end face of the cutout 68. Due to the relative rotation between the cages 65 and 66, the sprags 71 are tilted in the direction of rotation of the small-diameter cage 66 until their inner and outer cam surfaces 73 and 74 come into engagement with the cylindrical outer surface 62 and the cylindrical inner surface 64. In this state, the clutch can lock up instantly.

While the vehicle equipped with this differential clutch is traveling at a high speed, the rotary shaft 60 carrying the output gear 61 is rotating faster than the input gear 63, so that the sprags 71 are urged to their erect position by the frictional force that acts thereon. Their cam surfaces 73 and 74 are thus kept from coming into wedging engagement with the cylindrical outer surface 62 and the cylindrical inner surface 64.

If driving wheels slip in this state, the input gear 63 begins to rotate faster than the rotary shaft 60, pushing the sprags 71 until their cam surfaces 73 and 74 come into wedging engagement with the cylindrical outer surface 62 and the cylindrical inner surface 64. Rotation of the input gear 63 is now transmitted to the rotary shaft 60.

When the direction of rotation of the driving gear 78 changes over, the sprags 71 are inclined in the opposite direction to the above, performing the same function as above.

In such a conventional two-way differential clutch, since the driving gear 78 meshes with both the input gear 63 and the sub-gear 75, so large a difference in the number of teeth between the input gear 63 and the sub-gear 75 cannot be provided sufficiently. Thus, the difference in rotating speed between the large-diameter cage 65 and the small-diameter cage 66 is small when the driving gear 78 begins to rotate, so that it takes a long time for the sprags 71 to incline in the opposite direction until they engage the cylindrical outer surface 62 and the cylindrical inner surface 64. While the sprags 71 are inclining, slip occurs between the cam surfaces 73 and 74 of the sprags 71 and the cylindrical outer surface 62 and the cylindrical inner surface 64. Thus, the cam surfaces 73 and 74 and the cylindrical surfaces 62 and 64 tend to be worn.

An object of this invention is to provide a two-way differential clutch having means that permit the sprags to be inclined instantly in the opposite direction when the rotating direction of the input gear changes over.

SUMMARY OF THE INVENTION

According to this invention, there is provided a two-way differential clutch comprising an input gear having a cylindrical inner surface, a rotary shaft extending through said input gear and having a cylindrical outer surface, a large-diameter cage and a small-diameter cage mounted between said cylindrical inner surface of said input gear and said cylindrical outer surface of said rotary shaft, said larger-diameter cage being fixed to said input gear, and said small-diameter cage being rotatably supported on said rotary shaft, sprags mounted in pockets formed in said cages so as to engage said cylindrical inner surface of said input gear said cylindrical outer surface of said rotary shaft when said large-diameter cage and said small-diameter cage rotate relative to each other, a friction plate rotatably mounted on said small-diameter cage at one end thereof, a resilient member biasing said friction plate against a flange provided on said small-diameter cage, and a rotation stopper means for nonrotatably coupling said friction plate to a stationary member.

According to the second invention, there is provided a two-way differential clutch comprising an input gear having a cylindrical inner surface, a rotary shaft extending through said input gear and having a cylindrical outer surface, a large-diameter cage and a small-diameter cage mounted between said cylindrical inner surface of said input gear and said cylindrical outer surface of said rotary shaft, said larger-diameter cage being fixed to said input gear, and said small-diameter cage being rotatably supported on said rotary shaft, sprags mounted in pockets formed in said cages so as to engage said cylindrical inner surface of said input gear and said cylindrical outer surface of said rotary shaft when said large-diameter cage and said small-diameter cage rotate relative to each other, and a friction generating means kept in sliding contact with said small-diameter cage for applying frictional resistance to said small-diameter cage.

The two-way differential clutch according to the third invention comprises an input gear having a cylindrical inner surface, a rotary shaft extending through said input gear and having a cylindrical outer surface, a large-diameter cage and a small-diameter cage mounted between said cylindrical inner surface of said input gear and said cylindrical outer surface of said rotary shaft, said larger-diameter cage being fixed to said input gear, and said small-diameter cage being rotatably supported on said rotary shaft, sprags mounted in pockets formed in said cages so as to engage said cylindrical inner surface of said input gear and said cylindrical outer surface of said rotary shaft when said large-diameter cage and said small-diameter cage rotate relative to each other, a sub-gear rotatably mounted on said small-diameter cage at one end thereof, a resilient member biasing said sub-gear against a flange provided on the outer periphery of said small-diameter cage near its end, and an idle gear having a first gear meshing with said input gear and a second gear meshing with said sub-gear and having fewer teeth than said first gear.

Since the friction plate is nonrotatable, it is possible to create a large rotational speed difference between the large-diameter cage and the small-diameter cage when the rotating direction of the input gear is changed over. Thus, when the rotating direction of the input gear changes over, the sprags will instantly incline in the opposite direction to the position where they are ready to come into wedging engagement.

In the second invention, the friction generating means applies frictional resistance to the small-diameter cage to retard the rotation of the small-diameter cage. Thus, when the rotating direction of the input gear changes over, the sprags can instantly incline in the opposite direction.

In the third invention, the first gear of the idle gear is in mesh with the input gear, while its second gear, having fewer number of teeth than the first gear, is in mesh with the sub-gear. Due to the big difference in the number of teeth between the input gear and the sub-gear, it is possible to create a big rotating speed difference between the input gear and the sub-gear when the rotating direction of the input gear changes over. The sprags can thus instantly incline in the opposite direction.

Since the sprags incline instantly in the opposite direction to the position where they engage the cylindrical outer surface and the cylindrical inner surface, no slip will occur between the sprags and the cylindrical surfaces. Thus, it is possible to minimize the wear of the sprags, the input gear and the rotary shaft at their contact portions.

The clutch can be manufactured at a low cost because it is composed of fewer parts.

Other features and objects of the present invention will become apparent from the following description made with reference to the accompanying drawings, in which:

BRIEF DESCRIPTION OF THE DRAWINGS

FIG. 1A is a sectional view of a first embodiment according to this invention;

FIG. 1B is a sectional view taken along line I—I of FIG. 1A;

FIG. 1C is a sectional view taken along line II—II of FIG. 1A;

DETAILED DESCRIPTION OF THE PREFERRED EMBODIMENT

Figure 2B:
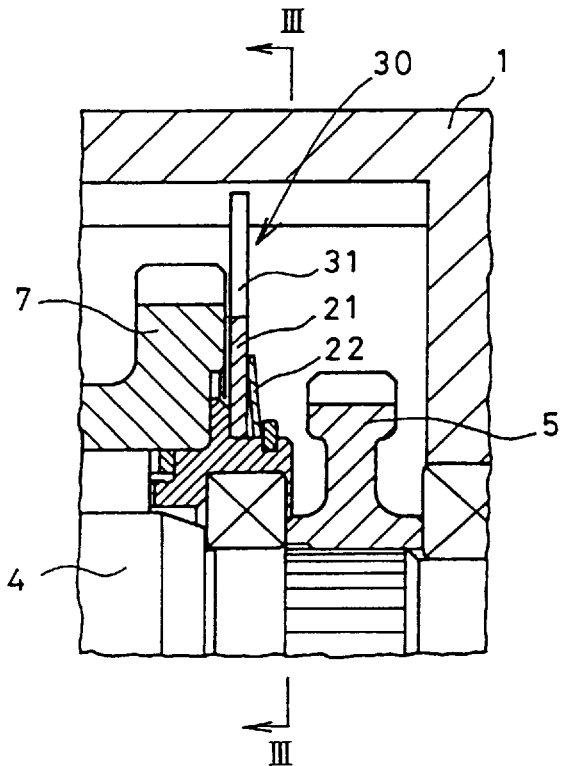
FIG. 2B is a sectional view taken along line III—III of FIG. 2A.
Figure 2A:
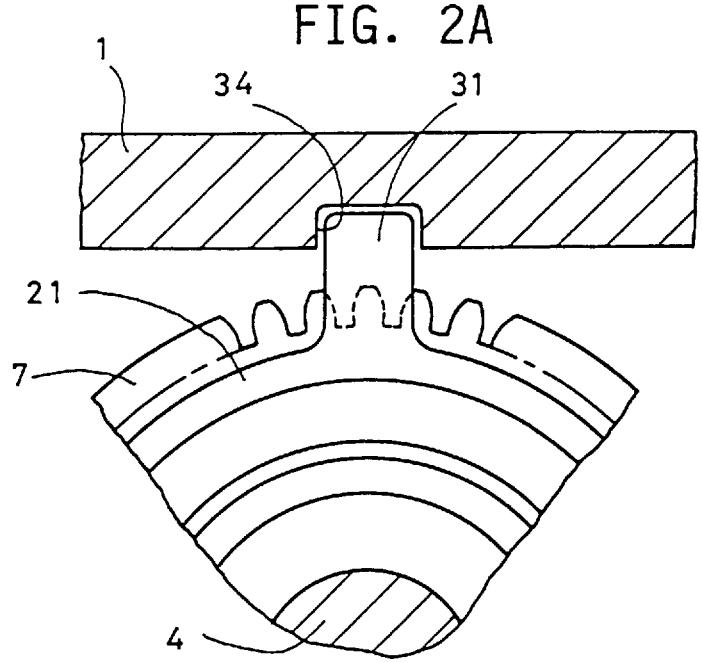
FIG. 2A is a sectional view of another type of rotation stopper of the first embodiment.

The embodiments of this invention are now described with reference to FIGS. 1–8.

FIGS. 1A, 1B and 1C show the first embodiment of this invention. As shown, bearings 3 are supported on opposite side walls 2 of a gear case 1. A rotary shaft 4 is rotatably supported at its ends by the bearings 3. An output gear 5 is mounted on the rotary shaft 4.

The rotary shaft 4 also carries a bearing 6 for supporting an input gear 7. The rotary shaft 4 has a cylindrical outer surface 8, while the input gear 7 has a cylindrical inner surface 9. Two cages 10 and 11 having different diameters are mounted between the cylindrical outer surface 8 and the cylindrical inner surface 9.

The large-diameter cage, i.e. the cage 10, is fixed to the input gear 7, whereas the small-diameter cage 11 is rotatably supported by a rotary shaft 4 through a bearing 12. A pin 13 provided on the small-diameter cage 11 is inserted in a circumferentially elongated pin hole 14 formed in the large-diameter cage 10, so that the cages 10 and 11 can rotate relative to each other between the positions at which the pin 13 abuts one and the other ends of the pin hole 14.

The large-diameter cage 10 and the small-diameter cage 11 are formed with a plurality of pockets 15 and 16, respectively, at circumferentially equal intervals (FIG. 1C). A sprag 17 is received in each pair of diametrically opposing pockets 15 and 16.

Resilient members 18 fixed to the small-diameter cage 11 bias each sprag 17 from both sides to its neutral position where its inner and outer cam surfaces 19 and 20 are not in engagement with the cylindrical outer surface 8 and the cylindrical inner surface 9, respectively.

A friction plate 21 is rotatably mounted on the small-diameter cage 11 at its end protruding outwardly from one end of the input gear 7. The friction plate 21 is pressed by a resilient member 22 in the form of a disk spring against a flange 23 provided on the outer periphery of the small-diameter cage 11 at its end.

The friction plate 21 is nonrotatably coupled to the stationary gear case 1 through a rotation stopper 30.

The rotation stopper means 30 comprises a protrusion 31 provided on the outer periphery of the friction plate 21, and an engaging plate 32 mounted on the inner surface of the gear case 1 and having a cutout 33 in which the protrusion 31 is inserted (FIG. 1B).

When the input gear 7 is rotated by the driving gear 24, the pockets 15 of the large-diameter cage 10 move circumferentially out of alignment with the pockets 16 of the small-diameter cage 11 because the friction plate 21, pressed against the flange 23, is prevented from rotating by the rotation stopper 30. As the pockets 15 and 16 move out of alignment with each other, the sprags 17 are tilted in the direction of rotation of the input gear 7 to the "standby" position in which their cam surfaces 19, 20 are ready to come into wedging engagement with the cylindrical outer surface 8 and the cylindrical inner surface 9.

If the revolving speed of the input gear 7 is higher than that of the rotary shaft 4 in this state, the sprags 17 actually come into wedging engagement with the cylindrical outer surface 8 and the cylindrical inner surface 9. Torque is thus transmitted from the input gear 7 to the rotary shaft 4. When the input gear 7 is rotated, the large-diameter cage 10 and the small-diameter cage 11 will rotate relative to each other until the pin 13 abuts one end of the pin hole 14. In this state, the flange 23 slips relative to the friction plate 21, so that the input gear 7 keeps rotating.

When the direction of rotation of the input gear 7 is reversed by reversing the rotating direction of the driving gear 24, the large-diameter cage 10 is rotated in the same direction as the input gear 7. But the small-diameter cage 11, kept in frictional contact with the nonrotatable friction plate 21, cannot rotate, so that the sprags 17 are tilted in the direction of rotation of the input gear 7 to the "standby" position in which their cam surfaces 19 and 20 are ready to come into wedging engagement with the cylindrical outer surface 8 and the cylindrical inner surface 9.

Since the friction plate 21 pressed against the flange 23 is a nonrotatable member, it is possible to create a large rotational speed difference between the large-diameter cage 10 and the small-diameter cage 11 when the rotating direction of the input gear 7 is changed over. Thus, when the rotating direction of the input gear 7 changes over, the sprags 17 will instantly incline in the opposite direction to the standby position where they are ready to come into wedging engagement.

FIGS. 2–5 show other embodiments of a rotation stopper 30. The rotation stopper 30 shown in FIGS. 2A and 2B comprises a groove 34 formed in the inner surface of the gear case 1, and a protrusion 31 provided on the outer periphery of the friction plate 21 and inserted in the groove 34.

Figure 3A:
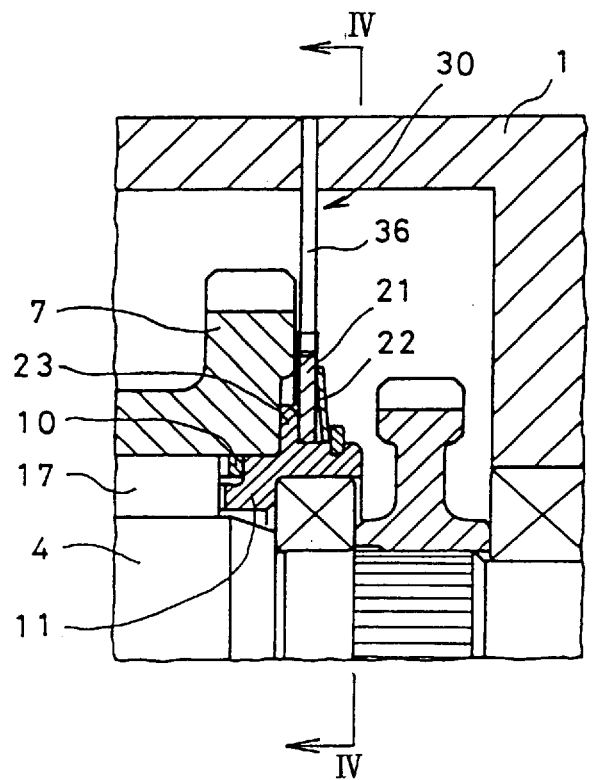
FIG. 3A is a sectional view of still another type of rotation stopper of the first embodiment.
Figure 3B:
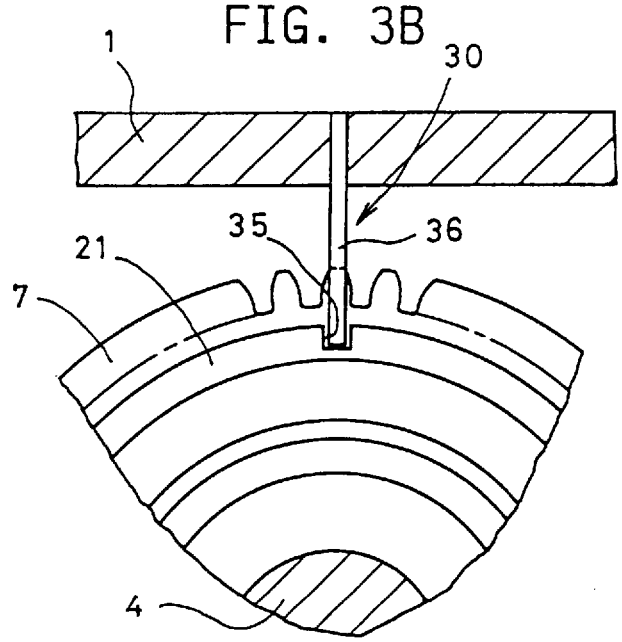
FIG. 3B is a sectional view taken along line IV—IV of FIG. 3A.

The rotation stopper 30 shown in FIGS. 3A and 3B comprises a cutout 35 formed in the outer periphery of the friction plate 21, and a pin 36 fixed to the gear case 1 and inserted in the cutout 35.

Figure 4A:
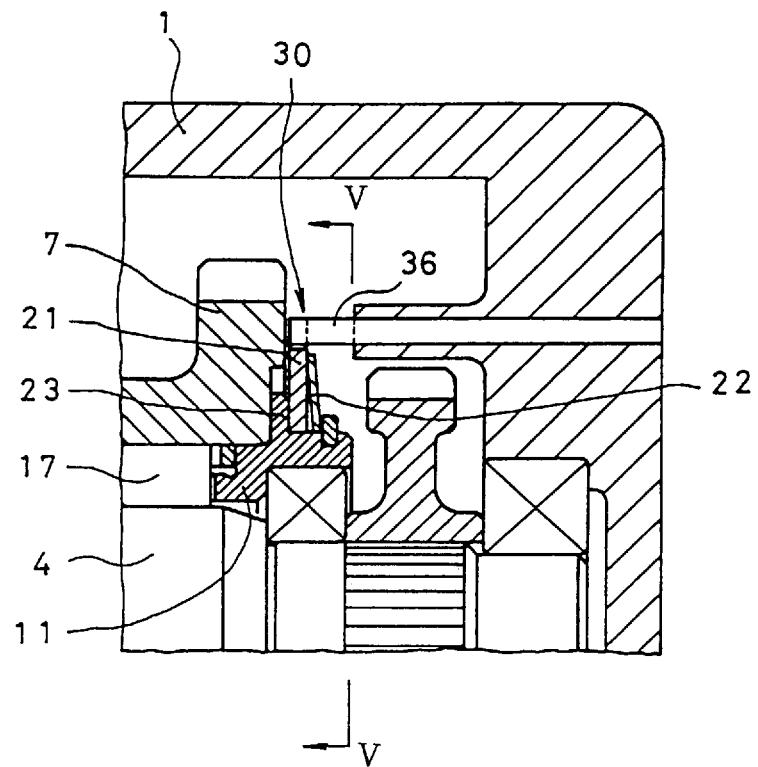
FIG. 4A is a sectional view of yet another type of rotation stopper of the first embodiment.
Figure 4B:
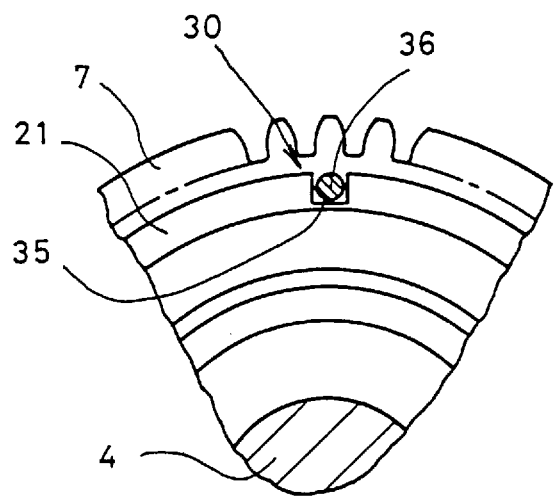
FIG. 4B is a sectional view taken along line V—V of FIG. 4A.

The rotation stopper 30 shown in FIGS. 4A and 4B has its pin 36, similar to the pin 36 shown in FIG. 3, fixed to the side wall 2 of the gear case 1.

Figure 5A:
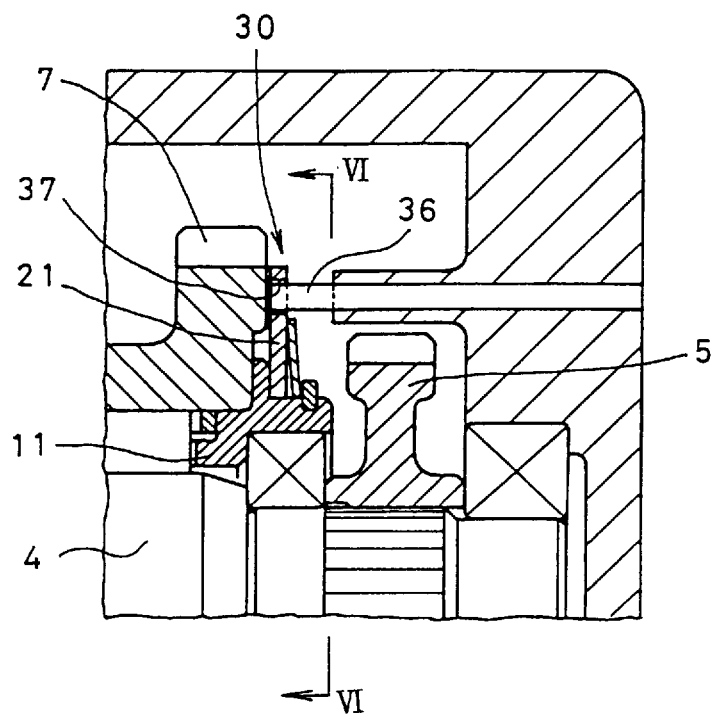
FIG. 5A is a sectional view of another rotation stopper of the first embodiment.
Figure 5B:
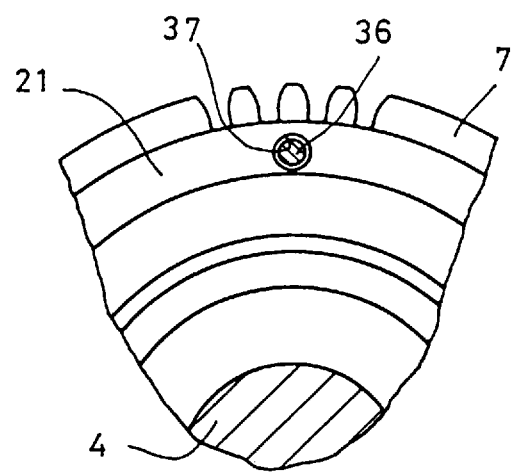
FIG. 5B is a sectional view taken along line VI—VI of FIG. 5A.

The rotation stopper 30 shown in FIGS. 5A and 5B has a pin hole 37 formed in the outer periphery of the friction plate 21 instead of the cutout 35 of the rotation stopper 30 shown in FIG. 4.

Figure 6A:
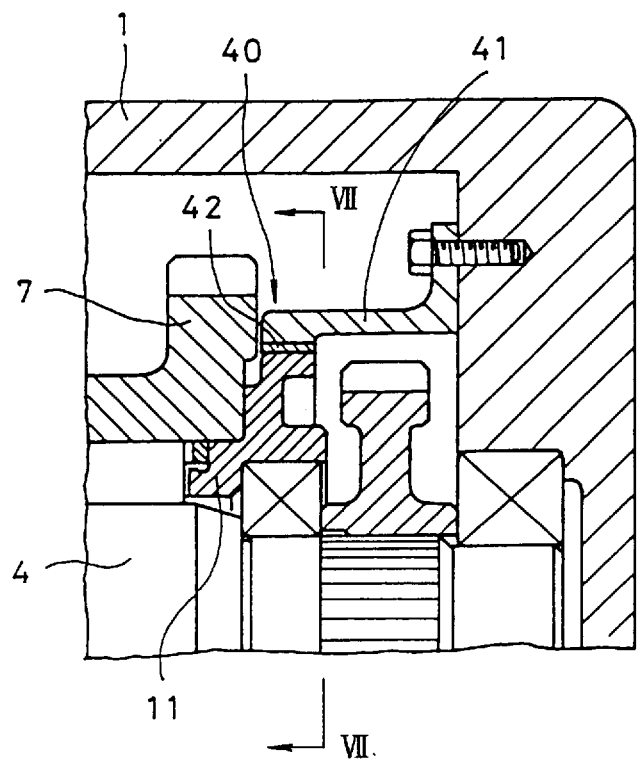
FIG. 6A is a sectional view of a second embodiment according to this invention.
Figure 6B:
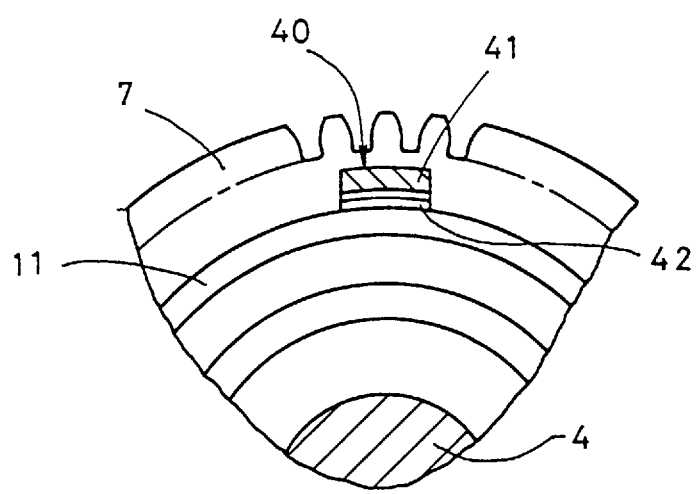
FIG. 6B is a sectional view taken along VII—VII of 6A.

FIG. 6A and 6B show the second embodiment of this invention. In this embodiment, instead of the friction plate 21 and the rotation stopper 30 shown in FIGS. 1A, 1B and 1C, a friction generating means 40 is used. It applies frictional resistance to the small-diameter cage 11 by being brought into sliding contact with it.

The friction generating means 40 comprises friction arms 41 fixed to the gear case 1, and friction members 42 attached to the tips of the friction arms 41 and pressed against the outer periphery of the small-diameter cage 11 at its end. The number of friction arms 41 is not limited.

Figure 7A:
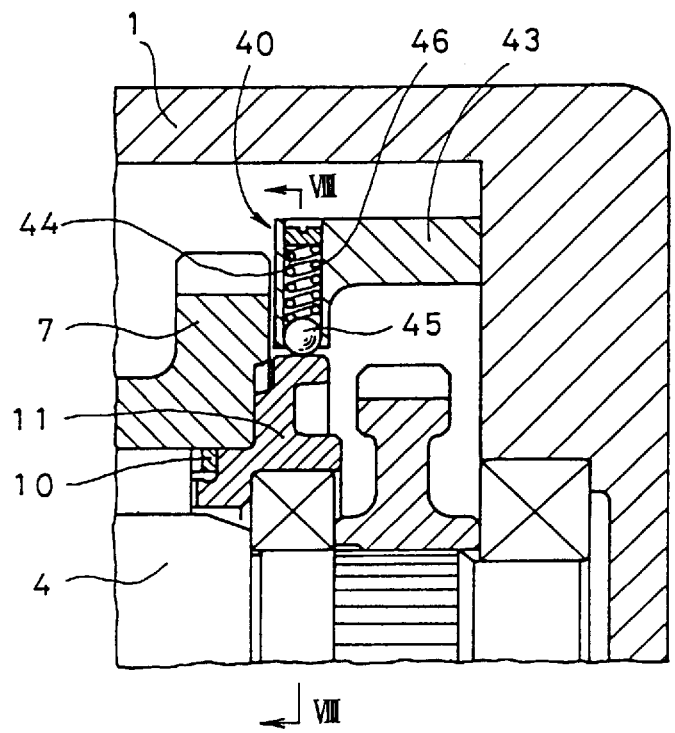
FIG. 7A is a sectional view of a different friction generating means of the second embodiment.
Figure 7B:
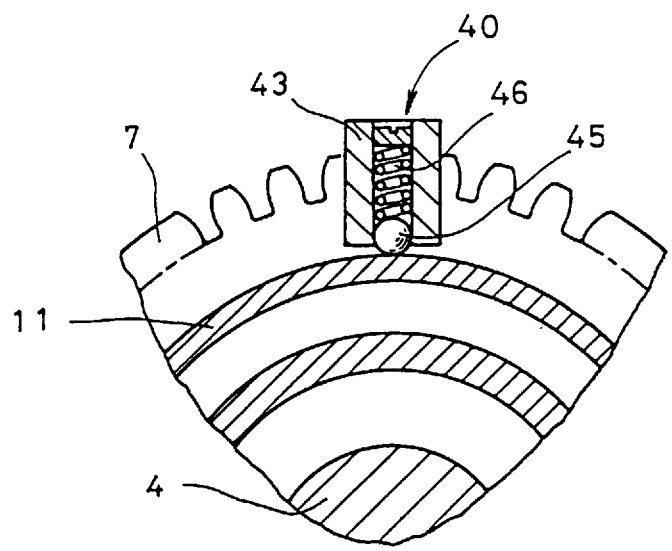
FIG. 7B is a sectional view taken along line VIII—VIII of FIG. 7A.

FIG. 7 shows a different friction generating means 40. It has arms 43 fixed to the side wall 2 of the gear case 1 and having holes 44 at the front end thereof. A ball 45 and a resilient member 46 are inserted in each hole 44 so that the ball 45 is pressed by the resilient member 46 against the outer periphery of the small-diameter cage 11 near its end.

By applying frictional resistance to the small-diameter cage 11 with the friction generating means 40, it is possible to create a large rotational speed difference between the large-diameter cage 10 and the small-diameter cage 11 when the rotating direction of the input gear 7 is changed over, as in the first embodiment. Thus, the sprags 17 will instantly incline in the opposite direction.

Figure 9A:
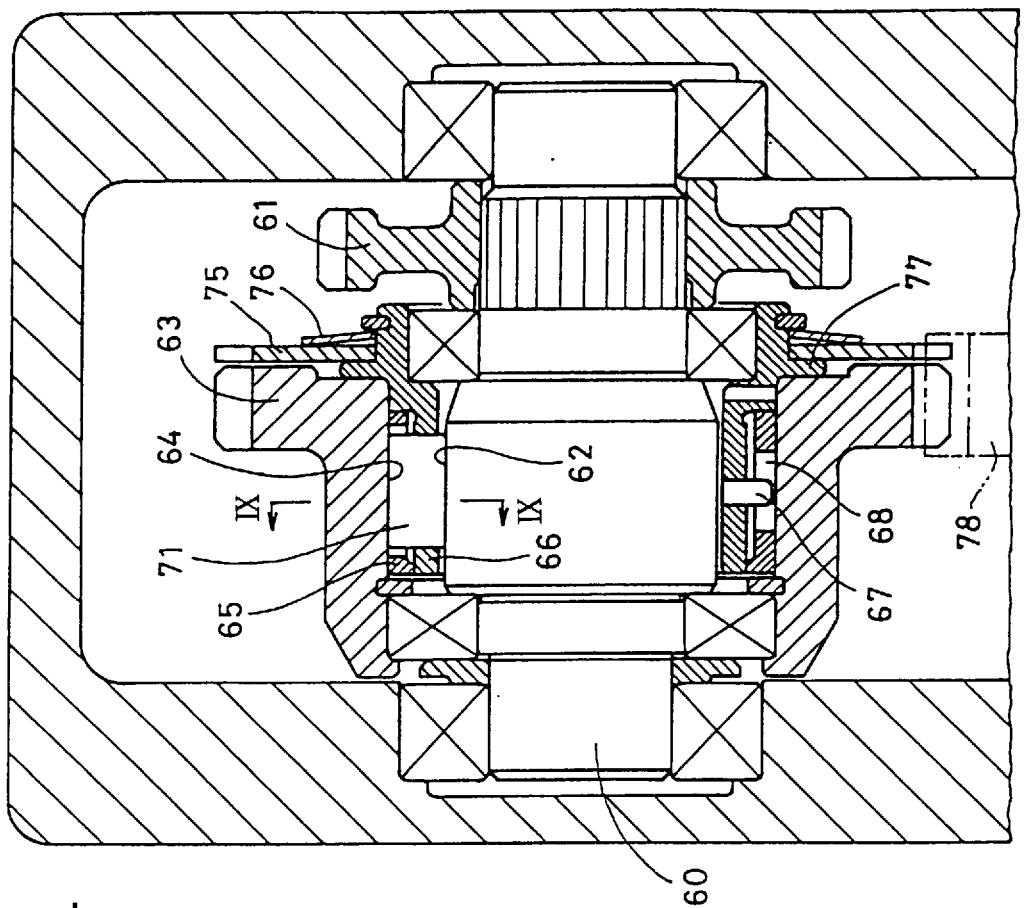
FIG. 9A is a sectional view of a conventional two-way differential clutch.
Figure 9B:
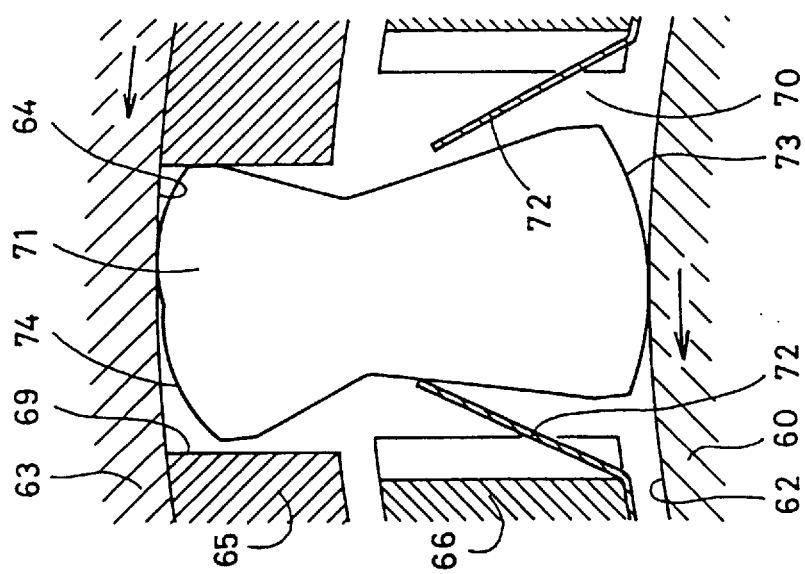
FIG. 9B is a sectional view taken along line IX—IX of FIG. 9A.

The friction generating means of this embodiment needs none of the sub-gear 75, the disk spring 76 and a retaining ring for retaining the disk spring 76 used in the conventional clutch shown in FIG. 9. Thus, the number of its parts is small and its manufacturing cost is low.

Figure 8:
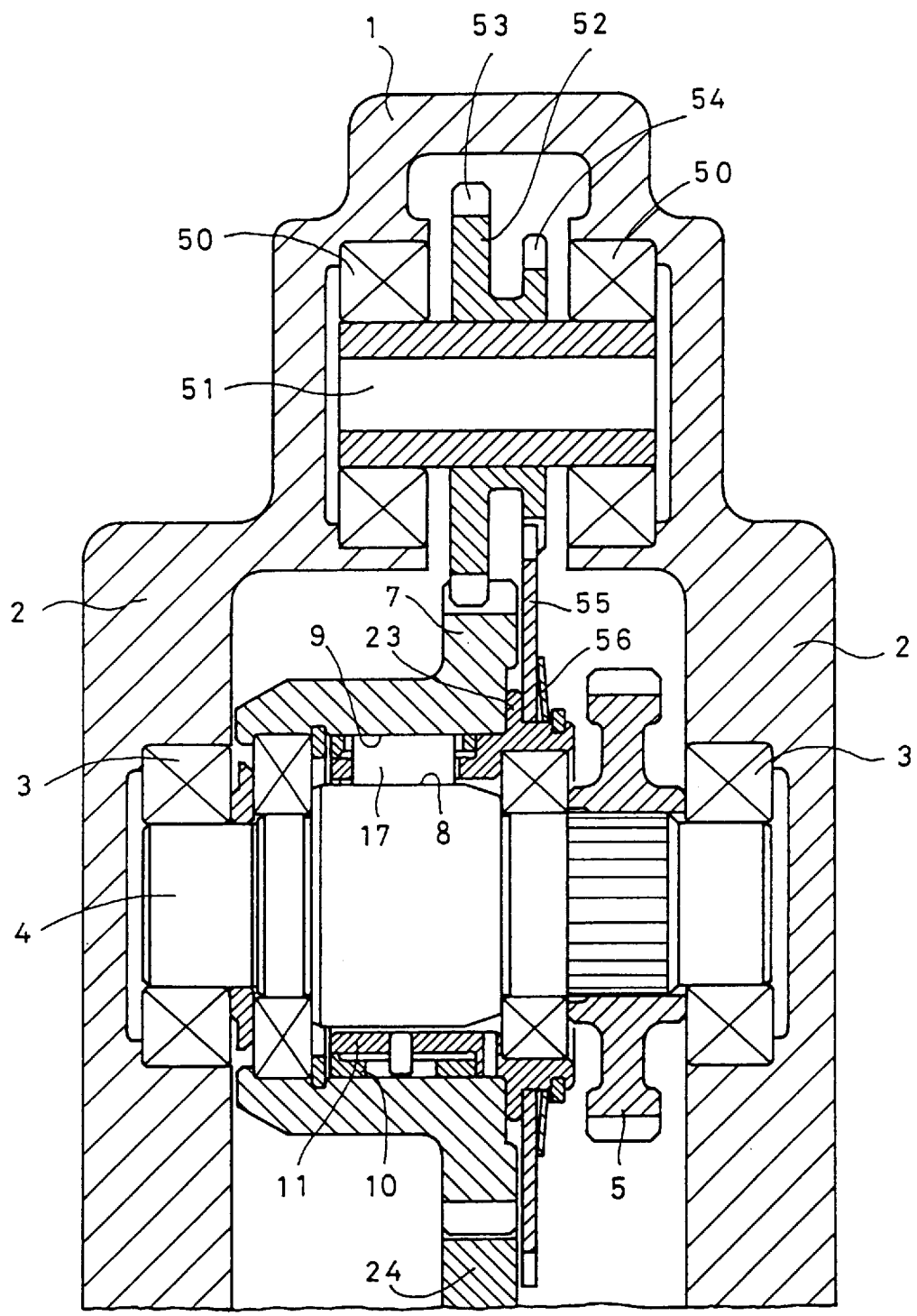
FIG. 8 is a sectional view of a third embodiment according to this invention.

FIG. 8 shows the third embodiment of this invention. In this embodiment, a gear shaft 51 is rotatably mounted directly or through bearings 50 on the side walls 2 of the gear case 1. The gear shaft 51 carries an idle gear 52 having a first gear 53 meshing with the input gear 7 and a second gear 54 having fewer teeth than the first gear 53 and meshing with a sub-gear 55.

The sub-gear 55 is rotatably mounted on the small-diameter cage 11 at its end and pressed by a resilient member 56 in the form of a disk spring against a flange 23 formed on the small-diameter cage 11.

The driving gear 24 meshes only with the input gear 7 and not with the sub-gear 55.

In this embodiment, it is possible to use a sub-gear 55 having a much greater number of teeth than the input gear 7. Thus, it is possible to create a large rotational speed difference between the large-diameter cage 10 and the small-diameter cage 11 when the rotating direction of the input gear 7 is changed over. Thus, the sprags 17 will instantly incline in the opposite direction to the standby position where they are ready to come into wedging engagement with the cylindrical outer surface 8 and the cylindrical inner surface 9.

What is claimed is:

1. A two-way differential clutch comprising an input gear having a cylindrical inner surface, a rotary shaft extending through said input gear and having a cylindrical outer surface, a large-diameter cage and a small-diameter cage mounted between said cylindrical inner surface of said input gear and said cylindrical outer surface of said rotary shaft, said larger-diameter cage being fixed to said input gear, said small-diameter cage being rotatably supported on said rotary shaft, sprags mounted in pockets formed in said cages so as to engage said cylindrical inner surface of said input gear said cylindrical outer surface of said rotary shaft when said large-diameter cage and said small-diameter cage rotate relative to each other, a friction plate rotatably mounted on said small-diameter cage at one end thereof, a resilient member biasing said friction plate against a flange provided on said small-diameter cage, and a rotation stopper means for nonrotatably coupling said friction plate to a stationary member.

2. A two-way differential clutch as claimed in claim 1 wherein said rotation stopper means comprises a plate member mounted on said stationary member and formed with a cutout, and a protrusion provided on the outer periphery of said friction plate and inserted in said cutout.

3. A two-way differential clutch as claimed in claim 1 wherein said rotation stopper means comprises a groove formed in said stationary member to extend in the axial direction of said rotary shaft, and a protrusion provided on the outer periphery of said friction plate and inserted in said groove.

4. A two-way differential clutch as claimed in claim 1 wherein said rotation stopper means comprises a cutout formed in the outer periphery of said friction plate, and a pin fixed to said stationary member and inserted in said cutout.

5. A two-way differential clutch as claimed in claim 1 wherein said rotation stopper means comprises a pin hole formed in the outer periphery of said friction plate, and a pin fixed to said stationary member and inserted in said pin hole.

\* \* \* \* \*